United States Patent
Yamazaki et al.

(10) Patent No.: US 12,334,595 B2
(45) Date of Patent: Jun. 17, 2025

(54) BATTERY PACK AND BATTERY PACK MANUFACTURING METHOD

(71) Applicants: TOYOTA JIDOSHA KABUSHIKI KAISHA, Toyota (JP); Prime Planet Energy & Solutions, Inc., Tokyo (JP)

(72) Inventors: Nobuyuki Yamazaki, Okazaki (JP); Yoshinori Shibata, Nagoya (JP); Seiichi Sakuramoto, Kobe (JP)

(73) Assignees: TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 544 days.

(21) Appl. No.: 17/728,390

(22) Filed: Apr. 25, 2022

(65) Prior Publication Data

US 2022/0344782 A1    Oct. 27, 2022

(30) Foreign Application Priority Data

Apr. 27, 2021    (JP) .................... 2021-075379

(51) Int. Cl.
*H01M 50/516* (2021.01)
*H01M 50/209* (2021.01)
*H01M 50/502* (2021.01)
*H01M 50/528* (2021.01)

(52) U.S. Cl.
CPC ....... *H01M 50/516* (2021.01); *H01M 50/209* (2021.01); *H01M 50/502* (2021.01); *H01M 50/528* (2021.01)

(58) Field of Classification Search
CPC ............ H01M 50/516; H01M 50/209; H01M 50/502; H01M 50/528
See application file for complete search history.

(56) References Cited

U.S. PATENT DOCUMENTS

| | | | |
|---|---|---|---|
| 2011/0159353 A1 | 6/2011 | Byun et al. | |
| 2020/0147714 A1* | 5/2020 | Wynn | B23K 9/0953 |
| 2020/0168883 A1* | 5/2020 | Omura | H01M 50/529 |
| 2021/0210821 A1 | 7/2021 | Okada et al. | |

FOREIGN PATENT DOCUMENTS

| | | | |
|---|---|---|---|
| CN | 108604658 A | 9/2018 | |
| JP | 2011-138765 A | 7/2011 | |
| JP | 5940374 B2 | 6/2016 | |
| JP | 2020-087704 A | 6/2020 | |
| WO | 2012/133711 A1 | 10/2012 | |
| WO | 2017/130706 A1 | 8/2017 | |
| WO | WO-2019124108 A1 * | 6/2019 | ............ H01M 2/10 |

\* cited by examiner

*Primary Examiner* — Eugenia Wang
(74) *Attorney, Agent, or Firm* — Dinsmore & Shohl LLP

(57) ABSTRACT

A battery pack manufacturing method according to an aspect of the present disclosure includes stacking battery cells, pressurizing a battery cell group provided by stacking the battery cells in a stacking direction, measuring positions of cell terminals of the battery cells included in the pressurized battery cell group, finding a center straight line passing through a center of a distribution of the positions of the cell terminals, positioning a welding jig configured to decide a position where a bus bar is pressed against at least one of the cell terminals with reference to the center straight line, and welding the bus bar that is pressed against the at least one of the cell terminals, to the at least one of the cell terminals by the welding jig.

5 Claims, 4 Drawing Sheets

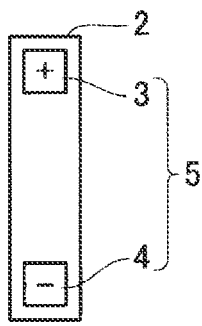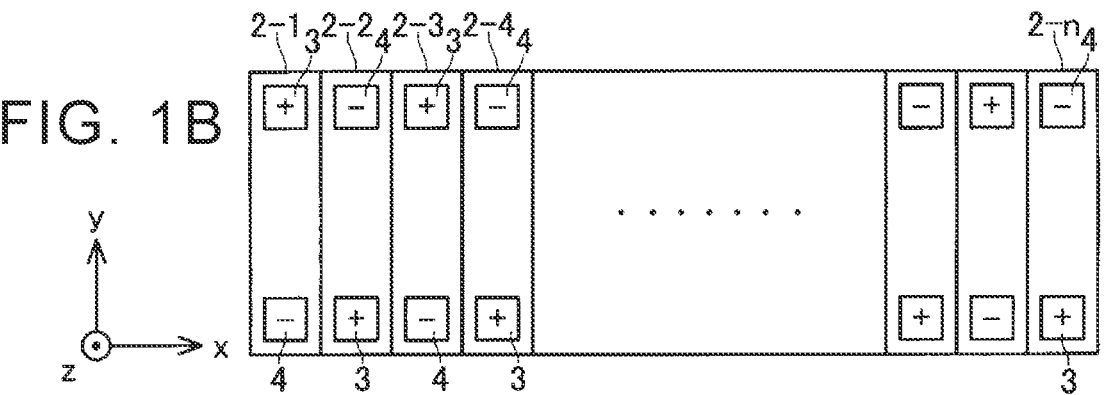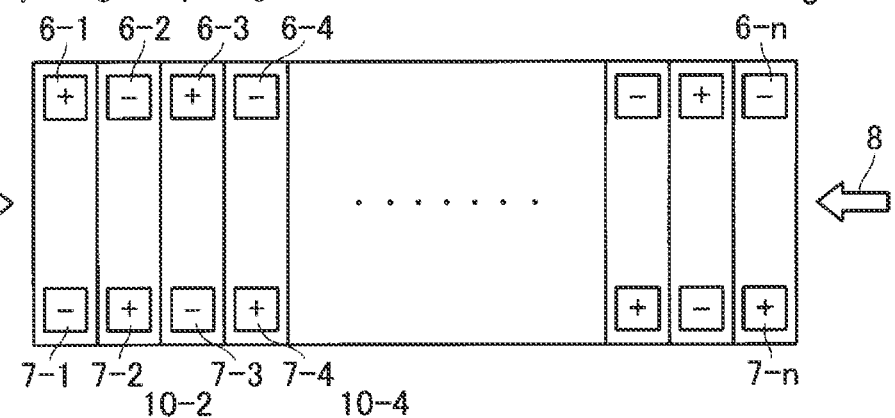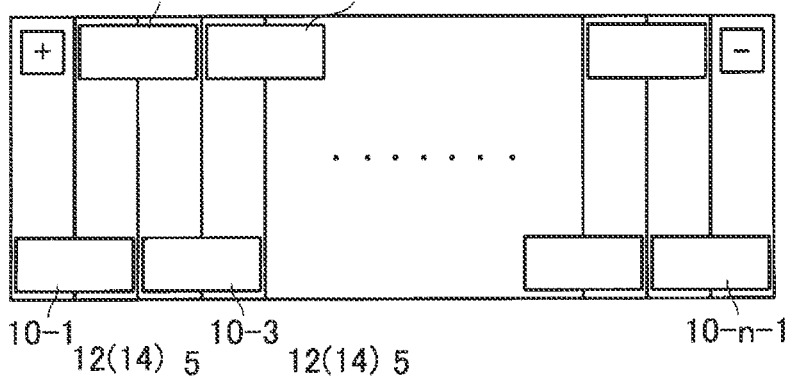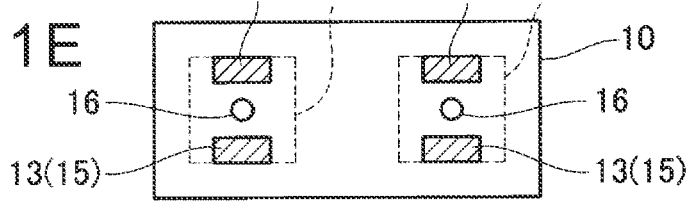

BATTERY PACK AND BATTERY PACK MANUFACTURING METHOD

CROSS-REFERENCE TO RELATED APPLICATION

This application claims priority to Japanese Patent Application No. 2021-075379 filed on Apr. 27, 2021, incorporated herein by reference in its entirety.

BACKGROUND

1. Technical Field

The present specification discloses a battery pack and a battery pack manufacturing method.

2. Description of Related Art

A battery pack, in which battery cells (hereinafter referred to as "cells") are connected by a bus bar is disclosed in Japanese Unexamined Patent Application Publication No. 2020-87704 (JP 2020-87704 A) and WO 2012/133711 A1.

SUMMARY

In an assembly process of a battery pack, correction work is frequently required. The present specification discloses technology for reducing the frequency of needing correction work, and improving productivity of battery packs.

The technology of the present specification improves a process of pressing a bus bar against a cell terminal and welding. In this process, cell terminals are not necessarily distributed along a straight line, and may be distributed along a non-straight line, such as a curved line, for example. It was found that correction work is required due to the cell terminals being distributed along a non-straight line. Accordingly, a battery pack manufacturing method according to an aspect disclosed in the present specification includes stacking battery cells, pressurizing a battery cell group provided by stacking the battery cells in a stacking direction, measuring positions of cell terminals of the battery cells included in the pressurized battery cell group, finding a center straight line passing through a center of a distribution of the positions of the cell terminals, positioning a welding jig configured to decide a position where a bus bar is pressed against at least one of the cell terminals with reference to the center straight line, and welding the bus bar that is pressed against the at least one of the cell terminals, to the at least one of the cell terminals by the welding jig. According to this manufacturing method, even when the cell terminals are distributed along a non-straight line, the pressing position of the bus bar can be suppressed from being greatly distanced from the position of the cell terminal, thereby reducing the frequency of needing correction work.

Also, a battery pack according to an aspect disclosed in the present specification includes a bus bar, and a battery cell group including cell terminals, in which pressing marks remaining on the bus bar extend along a center straight line passing through a center of a distribution of positions of the cell terminals.

Also, a battery pack according to an aspect disclosed in the present specification includes a bus bar, and a battery cell group including cell terminals, in which welding positions of the bus bar and the cell terminals extend along a center straight line passing through a center of a distribution of positions of the cell terminals.

Details and further improvements of the technology disclosed in the present specification will be described in the "DETAILED DESCRIPTION OF EMBODIMENTS" section below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1A illustrates a manufacturing process of a battery pack;

FIG. 1B illustrates a manufacturing process of the battery pack;

FIG. 1C illustrates a manufacturing process of the battery pack;

FIG. 1D illustrates a manufacturing process of the battery pack;

FIG. 1E illustrates a manufacturing process of the battery pack;

DETAILED DESCRIPTION OF EMBODIMENTS

Figure 2:
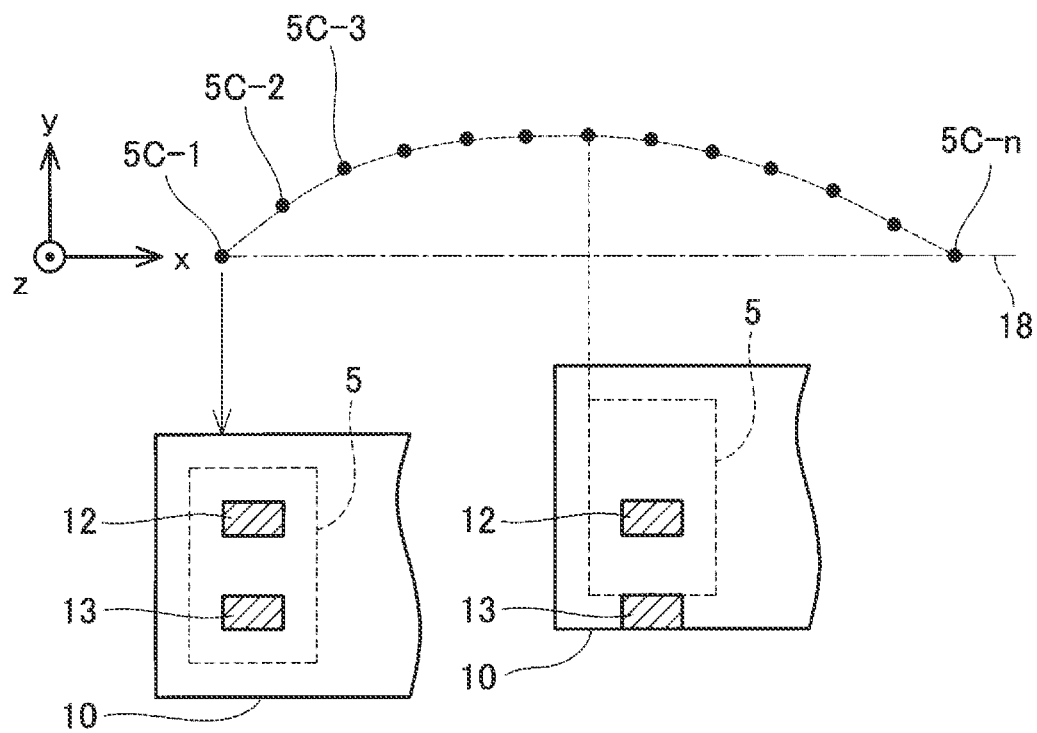
FIG. 2 describes a reason of a problem occurring.

According to an aspect disclosed in the present specification, in the battery pack manufacturing method, the battery cells included in the pressurized battery cell group may include a first battery cell including a cell terminal and positioned at a first end of the pressurized battery cell group and a second battery cell including a cell terminal and positioned at a second end of the pressurized battery cell group, and the center straight line may be parallel to a straight line passing through the cell terminal of the first battery cell and through the cell terminal of the second battery cell. According to such a configuration, the center straight line can be found without performing complicated calculations.

According to an aspect disclosed in the present specification, in the battery pack manufacturing method, the center straight line may be found such that among the distribution of the positions of the cell terminals, a distance to the center straight line is equal between a first cell terminal position of which a distance as to the center straight line in a first direction perpendicular to the stacking direction of the pressurized battery cell group is greatest, and a second cell terminal position of which a distance as to the center straight line in a second direction perpendicular to the stacking direction of the pressurized battery cell group is greatest. According to such a configuration, the center straight line can be found without performing complicated calculations.

According to an aspect disclosed in the present specification, in the battery pack, the battery cell group may be a pressurized battery cell group in a stacking direction, and the bus bar may be pressed toward at least one of the cell terminals and welded to the at least one of the cell terminals.

According to an aspect disclosed in the present specification, in the battery pack, the battery cell group may be a pressurized battery cell group in a stacking direction.

Assembly Process of Battery Pack

FIG. 1A is a top view of a cell 2. The cell 2 has a substantially flat cuboid shape, with a positive electrode terminal 3 and a negative electrode terminal 4 exposed on an upper face thereof. The positive electrode terminal 3 and the negative electrode terminal 4 will be collectively referred to as "cell terminal 5". Description made regarding the cell terminal 5 is common to the positive electrode terminal 3 and the negative electrode terminal 4. The cell terminal 5 is insulated from outer-surface forming material of the cell 2.

FIG. 1B illustrates a state in which cells 2 are stacked. Adjacent cells 2 are stacked so that the flat faces of the cells 2 face each other. When the cell group is connected serially, stacking is performed such that the positive electrode terminal 3 of one cell 2 and the negative electrode terminals 4 of cells 2 adjacent thereto are adjacent to each other, and the negative electrode terminal 4 thereof and the positive electrode terminals 3 of the cells 2 adjacent thereto are adjacent to each other. Hereinafter, the stacking direction is referred to as "x direction", the longitudinal direction of the upper face of the cells 2 is referred to as "y direction", and the height direction of the cells 2 is referred to as "z direction". The part of the cell group disposed in an intermediate range is omitted from illustration in FIGS. 1B to 1D. The number of cells to be stacked n is, for example, 28 to 34, although not limited in particular. The suffix numerals appended to the sign "2" indicate the position in the x direction, i.e., the stacking order of the cells 2.

FIG. 1C illustrates a state in which a group of stacked cells is pressurized and compressed in the stacking direction. Arrows 8 extending in the x direction represent the pressurizing force. Pressurization is performed by a pressure jig that is omitted from illustration. A compressed stacked cell group is referred to as a "stack". Hereinafter, cell terminals on the plus side in the y direction as viewed from the center of the upper face of the cells 2 in the y direction will be denoted by the sign "6", and cell terminals on the minus side in the y direction as viewed from the center of the upper face of the cell 2 in the y direction will be denoted by the sign "7". In the following description, the cell terminals 6 being on the plus side in the y direction as viewed from the center of the upper face of the cells 2 in the y direction will be referred to as being "on the plus side in the y direction". Similarly, the cell terminals 7 being on the minus side in the y direction as viewed from the center of the upper face of the cells 2 in the y direction will be referred to as being "on the minus side in the y direction". Note that the sign 6 and the sign 7 are also appended with suffix numerals in the same way as with the sign 2.

FIG. 1D illustrates a state in which bus bars 10 are disposed on the upper face of the stack. In FIG. 1D, suffix numerals are appended to the sign 10, in accordance with the position in the x direction. The bus bars 10-1, 10-3, and so forth, are disposed on the minus side in the y direction as viewed from the center of the upper face of the cell 2 in the y direction, and the bus bars 10-2, 10-4, and so forth, are disposed on the plus side in the y direction as viewed from the center of the upper face of the cell 2 in the y direction. In the following description, the bus bars 10-1, 10-3, and so forth being disposed on the minus side in the y direction as viewed from the center of the upper face of the cells 2 in the y direction will be referred to as being "disposed on the minus side in the y direction". Similarly, in the following description, the bus bars 10-2, 10-4, and so forth being disposed on the plus side in the y direction as viewed from the center of the upper face of the cells 2 in the y direction will be referred to as being "disposed on the plus side in the y direction". The bus bars 10-1, 10-2, and so forth are all the same, and common matters will be described with the suffix numerals omitted. Each bus bar 10 extends over a positive electrode terminal 3 and a negative electrode terminal 4 that are adjacent to each other.

FIG. 1E is an enlarged view of an upper face of one bus bar 10. A state in which the bus bar 10 is pressed against the cell terminal 5 from above in the z direction by pressing the upper face thereof, and the bus bar 10 and the cell terminal 5 are welded in that state using a welding jig (omitted from illustration), is illustrated in FIG. 1E. The pressing positions are denoted by 12 and 13, and the welding positions are denoted by 16. The bus bar 10 is welded to each of the positive electrode terminal 3 and the negative electrode terminal 4 that are adjacent to each other, so that the adjacent positive electrode terminal 3 and the negative electrode terminal 4 conduct. FIG. 1E exemplifies a case in which pressing is performed at both sides of the welding positions 16 in the y direction.

Figure 4:
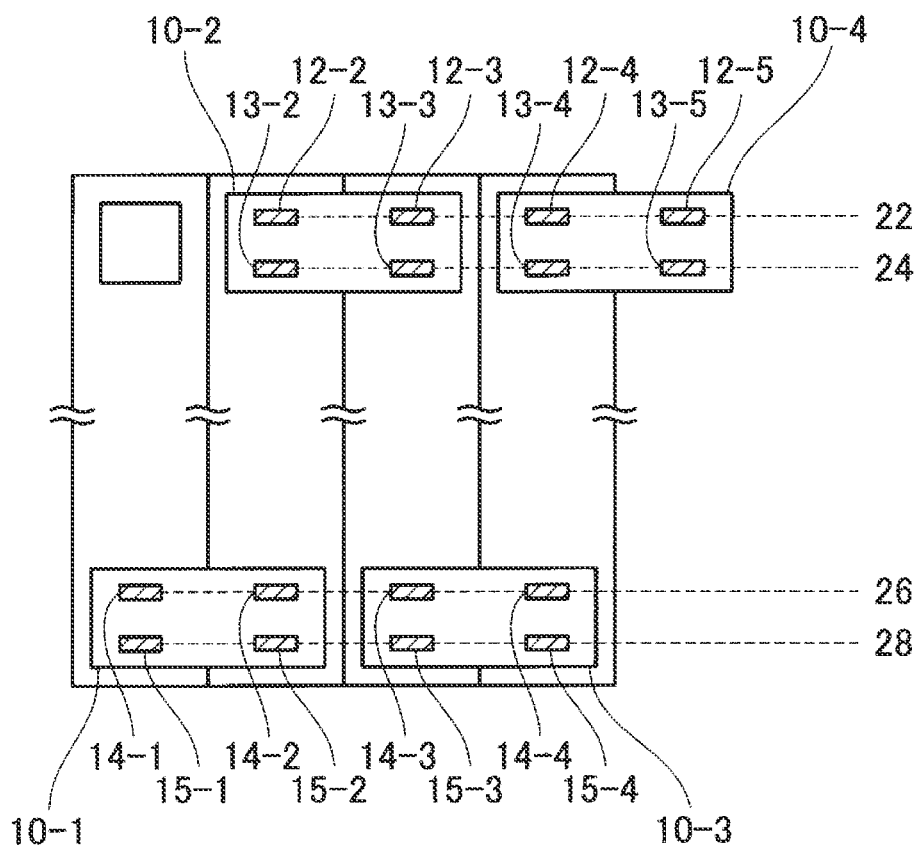
FIG. 4 illustrates a relation between bus bars and pressing positions.

As illustrated in FIG. 1D, with regard to the bus bars 10, there are the bus bars 10-1, 10-3, and so forth, disposed on the minus side in the y direction, and the bus bars 10-2, 10-4, and so forth, disposed on the plus side in the y direction. In the following, the pressing positions of the bus bars 10-2, 10-4, and so forth, disposed on the plus side in the y direction are denoted by 12 and 13, and the pressing positions of the bus bars 10-1, 10-3, and so forth, disposed on the minus side in the y direction are denoted by 14 and 15, as illustrated in FIG. 4. The suffix numerals indicate the stacking order of the cells 2.

A pressing member that presses the upper face of the bus bar 10 so that the bus bar 10 is pressed against the cell terminal 5 is positioned by a welding jig that is omitted from illustration, with four locations being pressed on each bus bar, as illustrated in FIG. 4. For example, the bus bar 10-1 disposed on the minus side in the y direction is pressed at the positions 14-1 and 14-2 on the plus side in they direction of the bus bar 10-1 as viewed from the center in the y direction, and is pressed at the positions 15-1 and 15-2 on the minus side in the y direction of the bus bar 10-1 as viewed from the center in the y direction. The bus bar 10-2 disposed on the plus side in the y direction is pressed at the positions 12-2 and 12-3 on the plus side in the y direction of the bus bar 10-2 as viewed from the center in the y direction, and is pressed at the positions 13-2 and 13-3 on the minus side in the y direction of the bus bar 10-2 as viewed from the center in they direction. The suffix numerals indicate the stacking order. In the following description, the pressing positions 14-1, 14-2, and so forth being the pressing positions on the plus side in the y direction as viewed from the center in the y direction on the bus bar 10 that is disposed on the minus side in the y direction will be referred to as being "pressing positions on the plus side in the y direction". Also, the pressing positions 15-1, 15-2, and so forth being the pressing positions on the minus side in the y direction as viewed from the center in the y direction on the bus bar 10 that is disposed on the minus side in the y direction will be referred to as being "pressing positions on the minus side in the y direction". Similarly, the pressing positions 12-2, 12-3, and so forth being the pressing positions on the plus side in the y direction as viewed from the center in the y direction on the bus bar 10 that is disposed on the plus side in the y direction will be referred to as being "pressing positions on the plus side in the y direction", and the pressing positions 13-2, 13-3, and so forth being the pressing positions on the minus side in the y direction as viewed from the center in the y direction on the bus bar 10 that is disposed on the plus side in the y direction will be referred to as being "pressing positions on the minus side in the y direction".

Note that the pressing member that presses the upper face of the bus bar 10 so that the bus bar 10 is pressed against the cell terminal 5 may be integral with the welding jig, or may be separate from the welding jig.

For example, the welding jig includes the portion from which laser is irradiated and weld by laser welding. For example, the pressing member is positioned under the welding jig and includes four pressing portions per one bus bar 10. Note that the pressing member is not limited to this example.

The pressing positions 15-1, 15-2, 15-3, 15-4, and so forth on the minus side in the y direction of the bus bars 10-1, 10-3, and so forth that are disposed on the minus side in the y direction, are positioned on a straight line 28 by the welding jig, and the pressing positions 14-1, 14-2, 14-3, 14-4, and so forth on the plus side in they direction are positioned on a straight line 26 by the welding jig. The pressing positions 13-2, 13-3, 13-4, 13-5, and so forth on the minus side in the y direction of the bus bars 10-2, 10-4, and so forth that are disposed on the plus side in the y direction, are positioned on a straight line 24 by the welding jig, and the pressing positions 12-2, 12-3, 12-4, 12-5, and so forth on the plus side in the y direction are positioned on a straight line 22 by the welding jig.

Problem

It was found that the compression process in FIG. 1C caused the positions of the cell terminals 5 to be displaced in the y direction as illustrated in a distribution diagram in FIG. 2, thus increasing the frequency of needing correction work. In the distribution diagram in FIG. 2, 5C denotes the center position of the cell terminal 5, and the suffix numerals appended to the signs 5C indicate the stacking order. The distribution diagram in FIG. 2 exemplifies a case in which the center positions 5C are not distributed along a straight line, but rather are distributed along a curved line.

In the conventional technology, a straight line 18 passing through a center position 5C-1 of the leftmost end cell terminal 5 and a center position 5C-n of the rightmost end cell terminal 5 is calculated, and the position of the welding jig is decided with reference to the straight line 18. That is to say, the positions of the straight lines 22, 24, 26, and 28 in FIG. 4 are decided with reference to the position of the straight line 18. As a result, in the leftmost end cell 2-1 corresponding to the center position 5C-1 of the cell terminal, the formation range of the cell terminal 5 and the pressing positions 12 and 13 are in the positional relation planned in advance, and the cell terminal 5 and the bus bar 10 can be welded as planned, as illustrated in FIG. 2. On the other hand, in a cell 2 near the middle in the stacking direction (x direction), the position of the cell terminal 5 is greatly shifted in the y direction as illustrated in FIG. 2. When the position of the cell terminal 5 is greatly shifted in the y direction, a phenomenon occurs in which the pressing positions 12 and 13 shift from the formation range of the cell terminal 5, and consequently the cell terminal 5 and the bus bar 10 cannot be welded as planned. In the case illustrated in FIG. 2, the positions of the cell 2 and the cell terminal 5 are greatly displaced in the y direction from the planned position in the intermediate range of the stacking direction (x direction), so welding defects occur more readily in this intermediate range, increasing the frequency of needing correction work. While FIG. 2 illustrates the phenomenon that occurs in the bus bar group disposed on the plus side in the y direction, the same phenomenon occurs in the bus bar group disposed on the minus side in the y direction.

Figure 3:
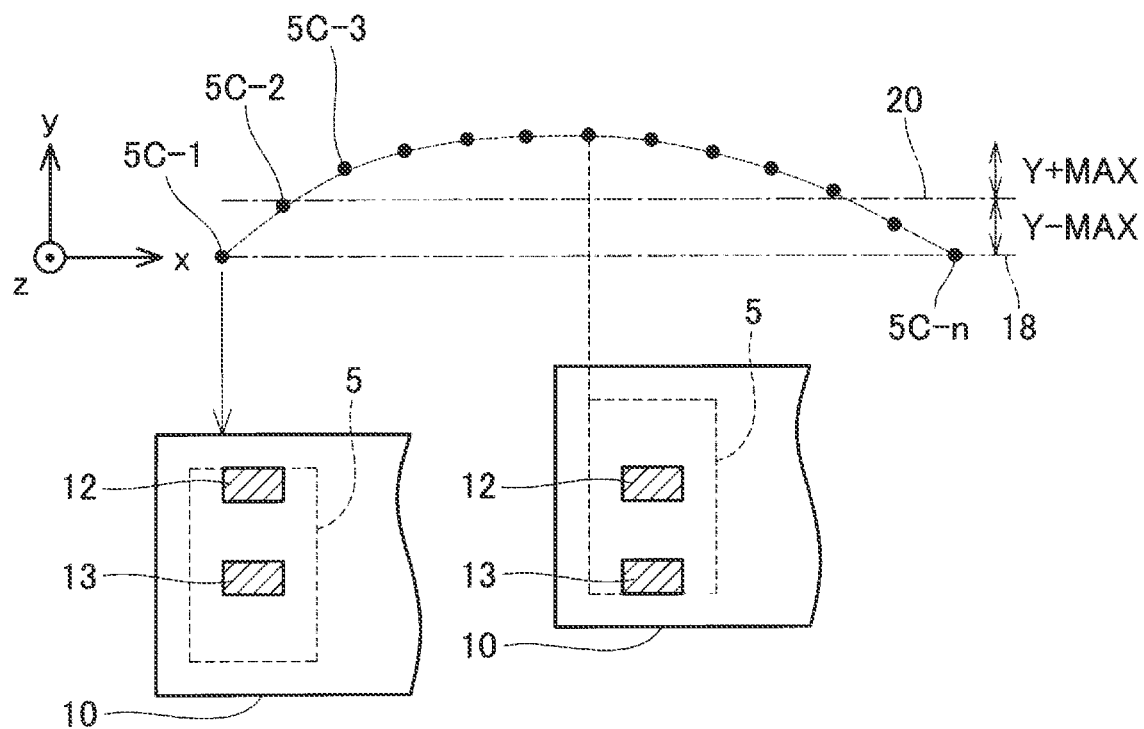
FIG. 3 describes a reason by which an improved manufacturing process solves the problem.

The distribution diagram in FIG. 3 is the same as the distribution diagram in FIG. 2, and illustrates a case in which the center positions 5C of the cell terminals 5 are not distributed along a straight line but are distributed along a curved line.

In the technology described in the present specification, for example, the center positions 5C of each of the cell terminals 5 are all measured and the distribution thereof is identified, a center straight line 20 passing through the center of the distribution is calculated, and the center straight line 20 is used as a reference to position the welding jig. A laser sensor is an example of a device for measuring positions, but the device for measuring positions is not limited to a laser sensor.

FIG. 3 illustrates the relation between the leftmost end cell terminal 5 corresponding to the cell terminal center position 5C-1 and the pressing positions 12 and 13 when the position of the welding jig is decided with reference to the center straight line 20. At the left end, the position of the cell terminal 5 is displaced to the minus side in the y direction from a planned position, with respect to the pressing positions 12 and 13, indicating that the cell terminal 5 will be pressed at a position deviated to the plus side in the y direction. In this case, even though the pressing positions 12 and 13 are deviated toward the plus side in the y direction of the cell terminal 5, the work of pressing the upper face of the bus bar 10 at the pressing positions 12 and 13 to press the bus bar 10 against the cell terminal 5 is not affected, and defective welding does not readily occur.

FIG. 3 also illustrates the relation between a cell terminal 5 around the middle in the stacking direction and the pressing positions 12 and 13 when the position of the welding jig is decided with reference to the center straight line 20. Around the middle, the position of the cell terminal 5 is displaced to the plus side in the y direction from the planned position, with respect to the pressing positions 12 and 13, indicating that the cell terminal 5 will be pressed at a position deviated to the minus side in the y direction. In this case, even though the pressing positions 12 and 13 are deviated toward the minus side in the y direction of the cell terminal 5, the work of pressing the upper face of the bus bar 10 at the pressing positions 12 and 13 to press the bus bar 10 against the cell terminal 5 is not affected, and defective welding does not readily occur.

As described above, the center positions 5C of each of the cell terminals 5 are all measured to identify the distribution, the center straight line 20 passing through the center of the distribution is calculated, and the pressing positions 12 and 13 are decided with reference to the center straight line 20, whereby the positional shift between the cell terminal 5 and the pressing positions 12 and 13 in the y direction assumes a positive or negative value, and the absolute value of the positional shift amount can be halved. As a result, occurrence of welding defects can be suppressed, and the frequency of needing correction work can be reduced. While FIG. 3 illustrates the phenomenon that occurs in the bus bar group disposed on the plus side in the y direction, the same phenomenon occurs in the bus bar group disposed on the minus side in the y direction.

The center straight line passing through the center of the distribution here may be a linear regression line, or may be a line obtained by a simpler calculation formula. For example, in FIG. 3, a center straight line 20 that is parallel to the straight line 18 that passes through the center position 5C-1 of the leftmost end cell terminal 5 and the center position 5C-n of the rightmost end cell terminal 5, and regarding which the absolute value of a maximum shift amount Y+MAX on the plus side in the y direction, and the absolute value of a maximum shift amount Y−MAX on the minus side in the y direction, from the center straight line 20, are equal to each other, is obtained, and is used as the center straight line passing through the center of the distribution. Note that the absolute value of the amount of shift from the center straight line 20 in the y direction can be deemed to be the distance from the center straight line 20 in a direction perpendicular to the stacking direction of the cell group.

A center straight line 20 may be obtained in which the average value of the absolute values of the amount of shift on the plus side in the y direction and the average value of the absolute values of the amount of shift on the minus side in the y direction, from the center straight line 20, are equal. A center straight line in which the cell terminal center positions 5C are distributed on both sides of the center straight line is sufficient.

Two Center Straight Lines

The above center straight line 20 can be calculated from the distribution of the cell terminals 6 on the plus side in the y direction in FIG. 1C, or can be calculated from the distribution of the cell terminals 7 on the minus side in the y direction. Following the pressurizing process in FIG. 1C, the distance between the cell terminals 6 on the plus side in the y direction of the cell 2 and the cell terminals 7 on the minus side in the y direction of the cell 2 remains approximately the same, a center straight line 20 calculated from the distribution of the cell terminals 6 on the plus side in the y direction and a center straight line 20 calculated from the distribution of the cell terminals 7 on the minus side in the y direction are approximately parallel, and the distance between both center straight lines is equal to the distance between the cell terminals 6 on the plus side in the y direction of the cell 2 and the cell terminals 7 on the minus side in the y direction of the cell 2, which is known. As a result, when implementing the present technology, the position of the welding jig may be adjusted with reference to the center straight line calculated from the distribution of the cell terminals 6 on the plus side in the y direction, or the position of the welding jig may be adjusted with reference to the center straight line calculated from the distribution of the cell terminals 7 on the minus side in the y direction. Therefore, only the center positions of each of the cell terminals 6 may be measured, or only the center positions of each of the cell terminals 7 may be measured. Alternatively, both the center straight line calculated from the distribution of the cell terminals 6 on the plus side in the y direction and the center straight line calculated from the distribution of the cell terminals 7 on the minus side in the y direction may be used, with the position of the welding jig being adjusted based on a straight line calculated from an average value thereof.

Adjustment of Bus Bar Position

Each of the pressing positions 12, 13, 14, and 15 is positioned on a straight line as illustrated in FIG. 4, by a welding jig that is omitted from illustration.

The bus bars 10 are positioned by the positions of two adjacent cell terminals 5. That is to say, the bus bar 10-1 disposed on the minus side in the y direction is positioned with reference to the positions of the cell terminals 7-1 and 7-2 on the minus side in the y direction in FIG. 1C, the bus bar 10-2 disposed on the plus side in the y direction is positioned with reference to the positions of the cell terminals 6-2 and 6-3 on the plus side in the y direction, the bus bar 10-3 disposed on the minus side in the y direction is positioned with reference to the positions of the cell terminals 7-3 and 7-4 on the minus side in they direction, and the bus bar 10-4 disposed on the plus side in the y direction is positioned with reference to the positions of the cell terminals 6-4 and 6-5 on the plus side in the y direction. In this case, the relative positional relation between the cell terminals 5 and the bus bars 10 to be welded thereto becomes constant. The distribution of the center positions of the cell terminals 5 and the distribution of the center positions of the bus bars 10 become equal. When the center positions of the cell terminals 5 are distributed along a curved line, the center positions of the bus bars 10 are also distributed along the same curved line. In FIGS. 2 and 3, the relative positional relation between the cell terminals 5 and the bus bars 10 is constant.

On the other hand, a bus bar layout jig can be used to dispose the bus bars 10-1, 10-3, and so forth on the minus side in the y direction on a straight line, and dispose the bus bars 10-2, 10-4, and so forth on the plus side in the y direction on a straight line, and the bus bar layout jig can be positioned with respect to the stack in FIG. 1C. In this case, the center straight line 20 illustrated in FIG. 3 is identified, and the bus bar layout jig is positioned based on the center straight line. Thus, when the cell terminals 5 are distributed along a curved line, the shift of the cell terminals 5 in the y direction from the center straight line 20 where the bus bars are disposed is distributed positively and negatively, the absolute value of the maximum shift amount Y+MAX on the plus side in the y direction and the absolute value of the maximum shift amount Y−MAX on the minus side in the y direction are equal to each other, and the absolute value of the maximum amount of shift is halved.

In the above case, the welding jig can be positioned with reference to the bus bar layout jig positioned as described above. By using the present technology when positioning the bus bar layout jig, and positioning the welding jig based thereupon, the present technology is used for positioning the welding jig.

Features of the embodiment will be described below.

Insulating Plate

In FIG. 1B, insulating plates that are omitted from illustration are disposed between adjacent cells 2 in the present embodiment. Shapes for positioning the bus bars 10 are formed on upper faces of the insulating plates. Thus, the bus bar 10-1 disposed on the minus side in the y direction is positioned with reference to the positions of the cell terminals 7-1 and 7-2 on the minus side in the y direction in FIG. 1C, the bus bar 10-2 disposed on the plus side in the y direction is positioned with reference to the positions of the cell terminals 6-2 and 6-3 on the plus side in the y direction, the bus bar 10-3 disposed on the minus side in the y direction is positioned with reference to the positions of the cell terminals 7-3 and 7-4 on the minus side in the y direction, and the bus bar 10-4 disposed on the plus side in the y direction is positioned with reference to the positions of the cell terminals 6-4 and 6-5 on the plus side in the y direction.

Stack Container

The stack illustrated in FIG. 1C is inserted into a case that is omitted from illustration, and thus is held in a compressed state. Note that the member holding the stack in a compressed state is not limited to the case. The upper face of the case is open, and a bus bar layout process, a pressing process using a welding jig, and a welding process using the welding jig are executed from outside the case.

Depending on the structure in which the stack is housed in the case, a straight line from the center position 5C-1 of the leftmost end cell terminal 5 to the center position 5C-n of the rightmost end cell terminal 5 may extend along the longitudinal direction of the case in some cases. FIGS. 2 and 3 illustrate such a case, and the longitudinal direction of the case is the x-axis.

On the other hand, there may be cases in which a straight line from the center position 5C-1 of the leftmost end cell terminal 5 to the center position 5C-n of the rightmost end cell terminal 5 may be inclined as to the longitudinal direction of the case. In this case, with the longitudinal direction of the case as the x-axis, the straight line 18 in FIG. 3 is inclined as to the x-axis. In this case, the center straight line 20 passing through the center of the distribution will also be inclined as to the x-axis.

Figure 5:
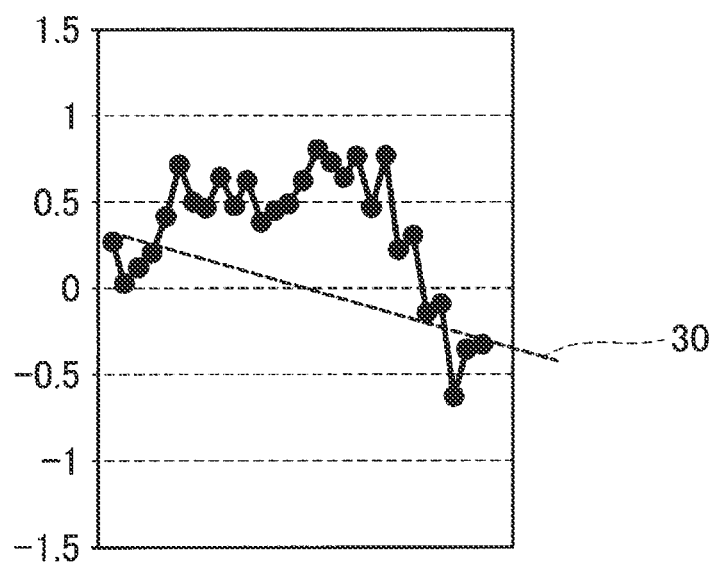
FIG. 5 shows a first stage of identifying a center straight line passing through a center of a distribution.

In FIG. 5, the horizontal axis is the x-direction positions (corresponding to the stacking order of cells), and the vertical axis is the y-direction positions of the center positions 5C of the cell terminals 5. The distribution of the center positions 5C of the cell terminals 5 is illustrated. A straight line 30 indicates a straight line passing through the center position 5C-1 of the leftmost end cell terminal 5 and the center position 5C-n of the rightmost end cell terminal 5, and the inclination angle θ of the straight line 30 is obtained. Thus, the relative rotation angle required for positioning the welding jig as to the stack housing case can be found.

Figure 6:
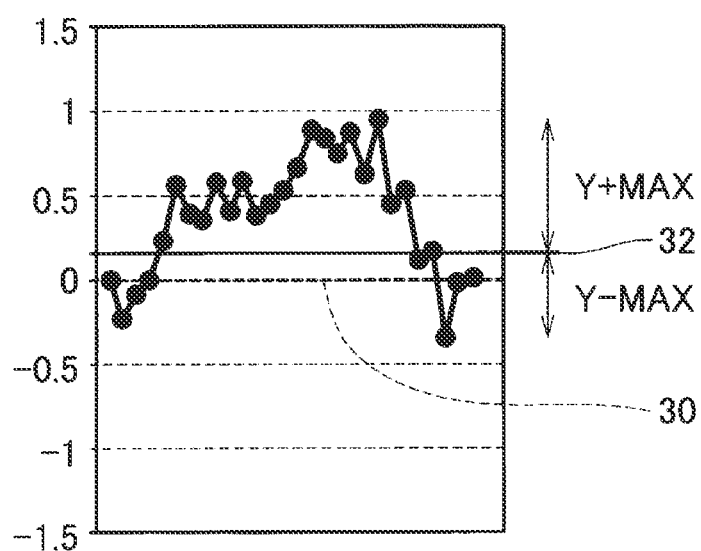
FIG. 6 shows a second stage of identifying a center straight line passing through the center of the distribution.

FIG. 6 is a graph showing amounts of shift from the straight line 30 in the y direction on the vertical axis. The center positions 5C of the cell terminals 5 are distributed along a curved line. A center straight line 32 is a straight line at which the absolute value of the maximum shift amount Y+MAX in the y-plus direction from the center straight line 32 and the absolute value of the maximum shift amount Y−MAX in the y-minus direction are approximately the same value.

Performing translation of the welding jig with reference to the center straight line 32 completes the positioning of the welding jig with respect to the stack accommodating case. By positioning the welding jig as described above, the absolute value of the maximum amount of shift between the pressing position and the cell terminals in the y direction is reduced, occurrence of welding defects is suppressed, and the frequency of needing correction work is reduced.

In the present embodiment, the welding positions are decided with reference to the welding jig.

Although pressing is performed on both sides of the welding positions in the y direction in the present embodiment, pressing may be performed only on the plus side of the welding positions in the y direction, or pressing may be performed only on the minus side of the welding positions in the y direction. As described above, the welding positions are decided with reference to the welding jig, and accordingly the distance between the pressing positions and the welding positions is managed. Depending on this distance, there are cases in which it is necessary to press on both sides, and cases in which pressing on one side is sufficient. In the present embodiment, welding technology for welding the rear face of the bus bar to the cell terminal by processing from the upper face side of the bus bar is used. Although laser welding technology is used in the embodiment, this is not limiting. Note that the term "welding" as used here encompasses brazing using a brazing material.

According to the present technology, a battery pack is obtained in which, when the stack is viewed from above, cell terminals are distributed along a non-straight line, but pressing marks generated in the pressing processing extend along the center straight line passing through the center of the distribution of the positions of the cell terminals. Also, a battery pack is obtained in which, although the cell terminals are distributed along a non-straight line, the welding positions thereof extend along the center straight line passing through the center of the distribution of the positions of the cell terminals.

While specific examples of the present disclosure are described in detail above, these are merely exemplary, and are not intended to limit the scope of the claims. The technology described in the claims includes various modifications and alterations of the specific examples exemplified above. The technical elements described in the present specification or the drawings have technical utility alone or in various combinations, and are not limited to the combinations described in the claims as originally filed. Also, the technology exemplified in the present specification or the drawings may achieve a plurality of objects at the same time, and achieving one of these objects in itself has technical utility.

What is claimed is:

1. A battery pack manufacturing method, comprising:
   stacking battery cells;
   pressurizing a battery cell group provided by stacking the battery cells in a stacking direction;
   measuring positions of cell terminals of the battery cells included in the pressurized battery cell group;
   finding a center straight line passing through a center of a distribution of the positions of the cell terminals;
   positioning a welding jig configured to decide a position where a bus bar is pressed against at least one of the cell terminals with reference to the center straight line; and
   welding the bus bar that is pressed against the at least one of the cell terminals, to the at least one of the cell terminals by the welding jig.

2. The battery pack manufacturing method according to claim 1, wherein,
   the battery cells included in the pressurized battery cell group include a first battery cell including a cell terminal and positioned at a first end of the pressurized battery cell group and a second battery cell including a cell terminal and positioned at a second end of the pressurized battery cell group, and
   the center straight line is parallel to a straight line passing through the cell terminal of the first battery cell and through the cell terminal of the second battery cell.

3. The battery pack manufacturing method according to claim 1, wherein, the center straight line is found such that among the distribution of the positions of the cell terminals, a distance to the center straight line is equal between a first cell terminal position of which a distance as to the center straight line in a first direction perpendicular to the stacking direction of the pressurized battery cell group is greatest, and a second cell terminal position of which a distance as to the center straight line in a second direction perpendicular to the stacking direction of the pressurized battery cell group is greatest.

4. The battery pack manufacturing method according to claim 1, wherein, the cell terminals are distributed along a curved line.

5. The battery pack manufacturing method according to claim 1, further comprising measuring the positions of at least three cell terminals, and finding a center straight line passing through a center of a distribution of the positions of the at least three cell terminals.

* * * * *